US 6,726,227 B2

(12) United States Patent
Morgan

(10) Patent No.: US 6,726,227 B2
(45) Date of Patent: Apr. 27, 2004

(54) VENDOR PUSH CART KIOSK TO RESEMBLE A FAMILIAR OBJECT

(76) Inventor: Robin Morgan, 8200 Blvd. East. - Apt. 70, North Bergen, NJ (US) 07047

( * ) Notice: Subject to any disclaimer, the term of this patent is extended or adjusted under 35 U.S.C. 154(b) by 74 days.

(21) Appl. No.: 09/972,059

(22) Filed: Oct. 5, 2001

(65) Prior Publication Data

US 2003/0067131 A1 Apr. 10, 2003

(51) Int. Cl.⁷ .................................................. B62B 3/02
(52) U.S. Cl. ............................. 280/47.35; 280/47.26; D34/13; D34/14; D34/19
(58) Field of Search ............................. D34/13, 14, 19; 280/47.26, 47.35; 296/22; D6/460, 474, 481

(56) References Cited

U.S. PATENT DOCUMENTS

| | | | |
|---|---|---|---|
| 4,129,911 A | * 12/1978 | McDonald et al. | 441/74 |
| 4,555,836 A | * 12/1985 | Martin | 29/428 |
| 4,610,478 A | * 9/1986 | Tervol | 296/214 |
| 4,798,549 A | * 1/1989 | Hirsch | 441/74 |
| 5,486,321 A | 1/1996 | Spatenkal | |

OTHER PUBLICATIONS

"Fiberglass Basics", Custom Car Stereo, (http://ccs.exl.info/fbglass.html).*
"About Bondo", Bondo Corporation, (http://bondo-online.com/about.asp.*
"Styrofoam, Insulating the world", (1995–2003), The Dow Chemical Company, (http://dow.com/styrofoam/).*

* cited by examiner

Primary Examiner—Brian L. Johnson
Assistant Examiner—J. Allen Shriver
(74) Attorney, Agent, or Firm—Gibbons, Del Reo, Dolan, Griffinger & Vecchione

(57) ABSTRACT

A vendor push cart kiosk having a configuration of a familiar object. It may include base, an umbrella extending from the base, wheels attached to the base, handles attached to the base to permit manual pushing against the handles to roll the base along a ground with the wheels. The base has interior compartments containing vendor products such as frozen ices, a cold source such a dry ice to keep the interior compartments cold and thus keep the vendor products cold, and lids that open to provide access to the vendor products within the interior compartments and that close. The interior compartments, including the lid, are insulated.

11 Claims, 5 Drawing Sheets

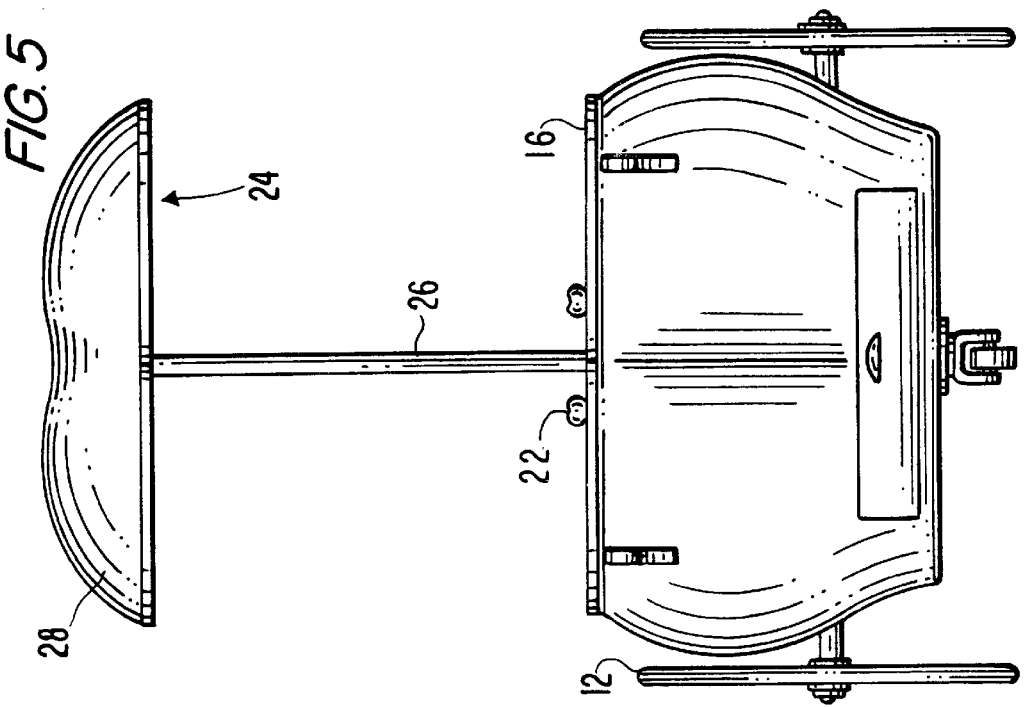
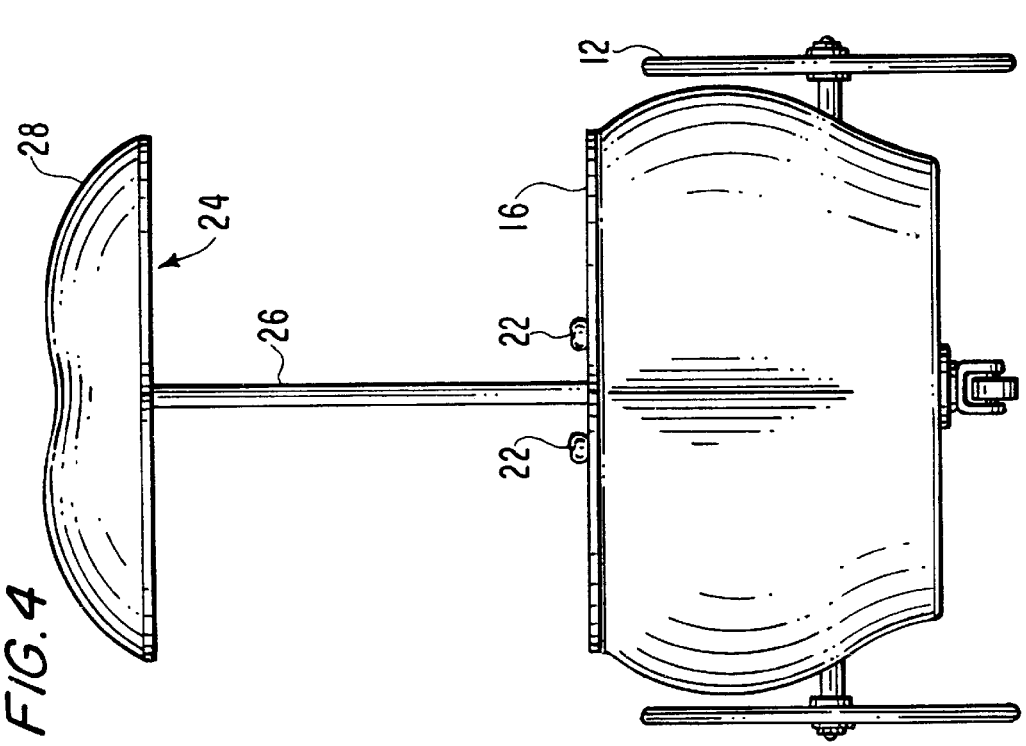

VENDOR PUSH CART KIOSK TO RESEMBLE A FAMILIAR OBJECT

BACKGROUND OF THE INVENTION

1. Field of the Invention

The invention relates to vendor push cart kiosks. The invention lies in changing its configuration to resemble that of a familiar object such that the umbrella portion and the base portion cooperate with each other to provide an overall impression of that of the familiar object.

2. Discussion of Related Art

Conventional vendor push cart kiosks for selling frozen products have not changed significantly in their configuration over the years. Their base is generally rectangular box-like, which may be stored in a compact manner. Each has a fold-up umbrella, whose pole extends upward from about the center of the base.

On the other hand, methods for repairing dents and other damage to automobile bodies are well known. Most repair techniques utilize a step straightening the dents as much as possible and then filling in the depressed areas with a "bondo" or other formable filler material, including plastic-containing and fiber-glass-containing materials. After the filler material is put in place over the damaged area, it is allowed to harden. The material is then ground and sanded to obtain a smooth surface which duplicates the original automobile body surface. The grinding and sanding process is a very labor-intensive and time-consuming process. The additional time and labor greatly increases the cost of repairs since the filler material must be substantially hardened before it can be ground or sanded. In addition, sanding and grinding creates large amounts of dust, which requires cleaning and containment and poses health hazards to workers. The time and energy spent waiting for the filler material to dry and then reshaping the filler material after it has dried fully adds greatly to the expense and effort required to repair auto body damage. U.S. Pat. No. 5,486,321, whose contents are incorporated herein by reference, proposes the use a shaping and smoothing tool to reduce the amount of sanding required by using the tool instead prior to full hardening.

It would be desirable to render the conventional vendor push carts for selling frozen products more eye catching and thus more likely to attract crowds and thereby potential customers.

BRIEF SUMMARY OF THE INVENTION

One aspect of the present invention relates to a vendor push cart kiosk having a configuration of a familiar object. It may include base, an umbrella extending from the base, wheels attached to the base, handles attached to the base to permit manual pushing against the handles to roll the base along a ground with the wheels. The base has interior compartments containing vendor products such as frozen ices, a cold source such a dry ice to keep the interior compartments cold and thus keep the vendor products cold, and lids that open to provide access to the vendor products within the interior compartments and that close. The interior compartments, including the lid, are insulated.

The base and the umbrella are shaped to complement with each other to resemble the configuration of a familiar object, such as an apple or a baseball.

BRIEF DESCRIPTION OF THE SEVERAL VIEWS OF THE DRAWING

For a better understanding of the present invention, reference is made to the following description and accompanying drawings, while the scope of the invention is set forth in the appended claims.

FIG. 4 is a front view thereof;

FIG. 5 is a rear view thereof;

DETAILED DESCRIPTION OF THE INVENTION

Figure 1:
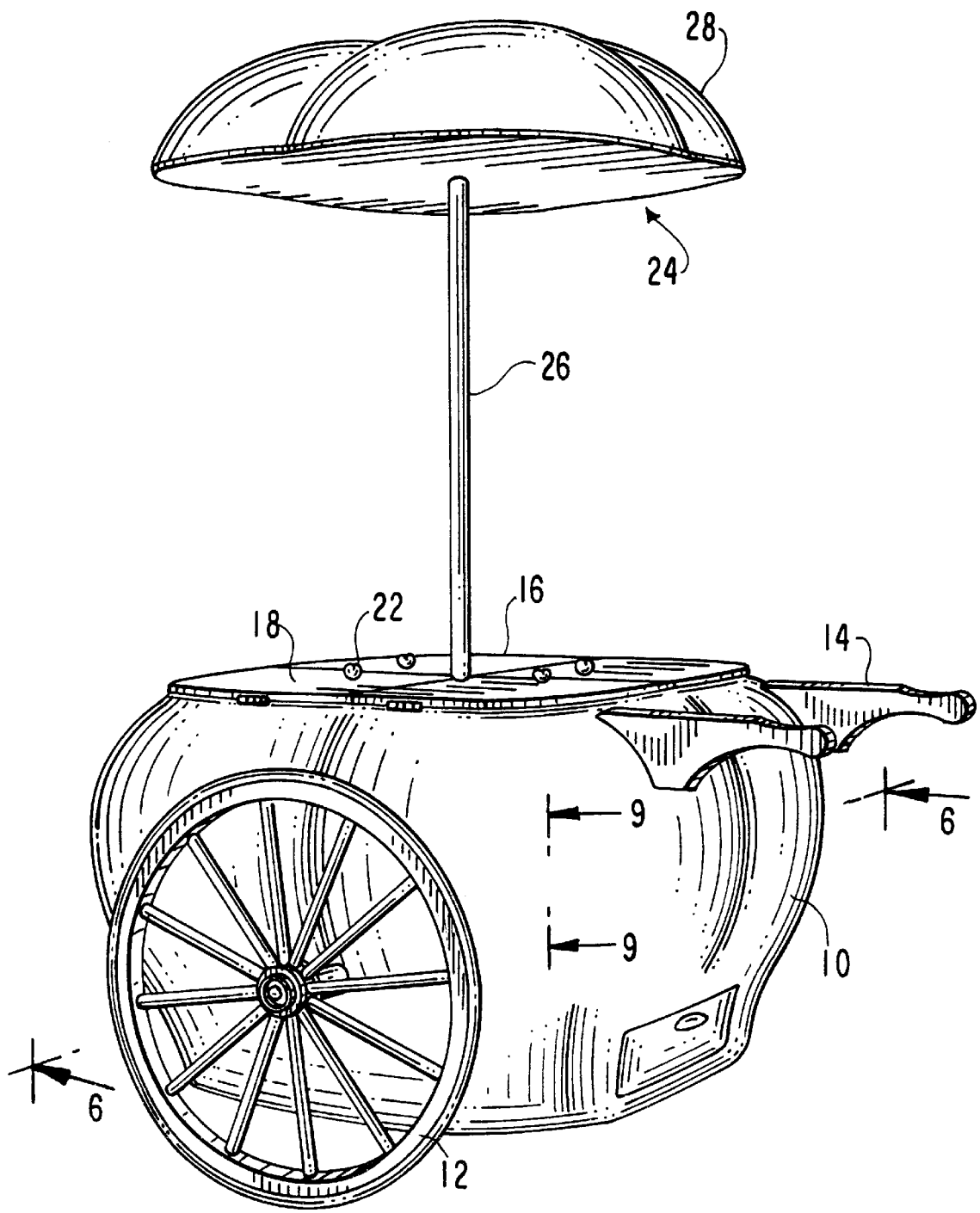
FIG. 1 is a perspective view of a vendor push cart kiosk in accordance with an embodiment of the invention.
Figure 3:
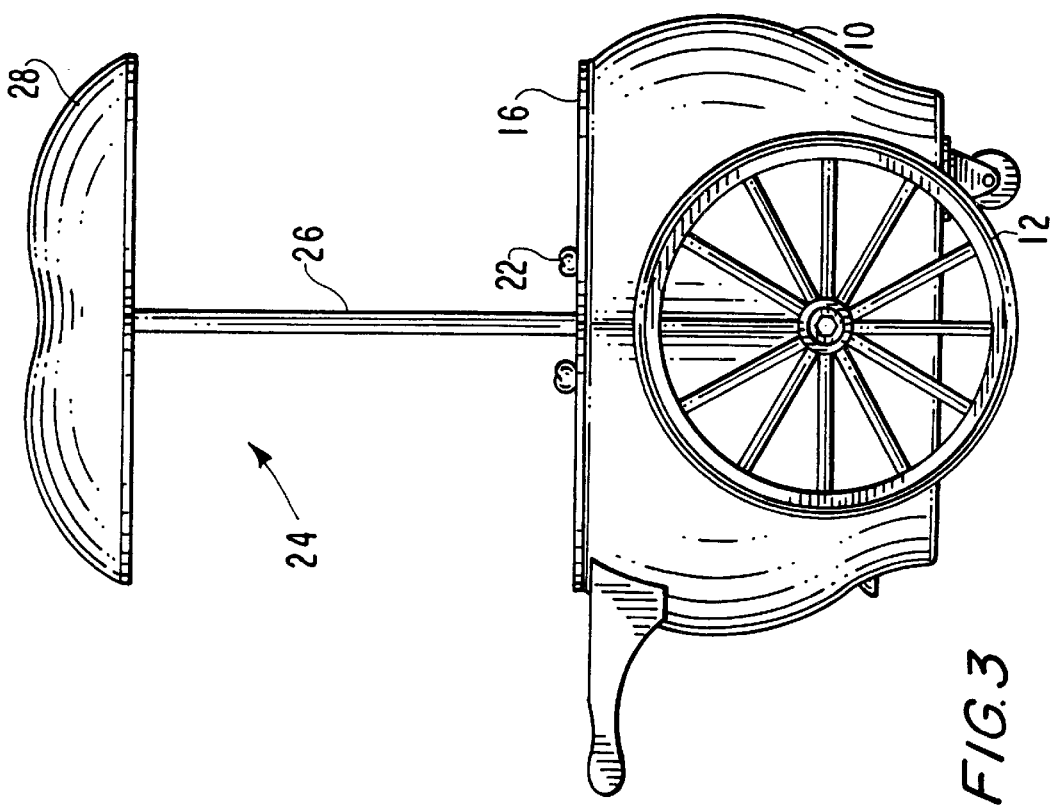
FIG. 3 is a left elevational view thereof that is symmetrical/identical to the right view thereof.
Figure 2:
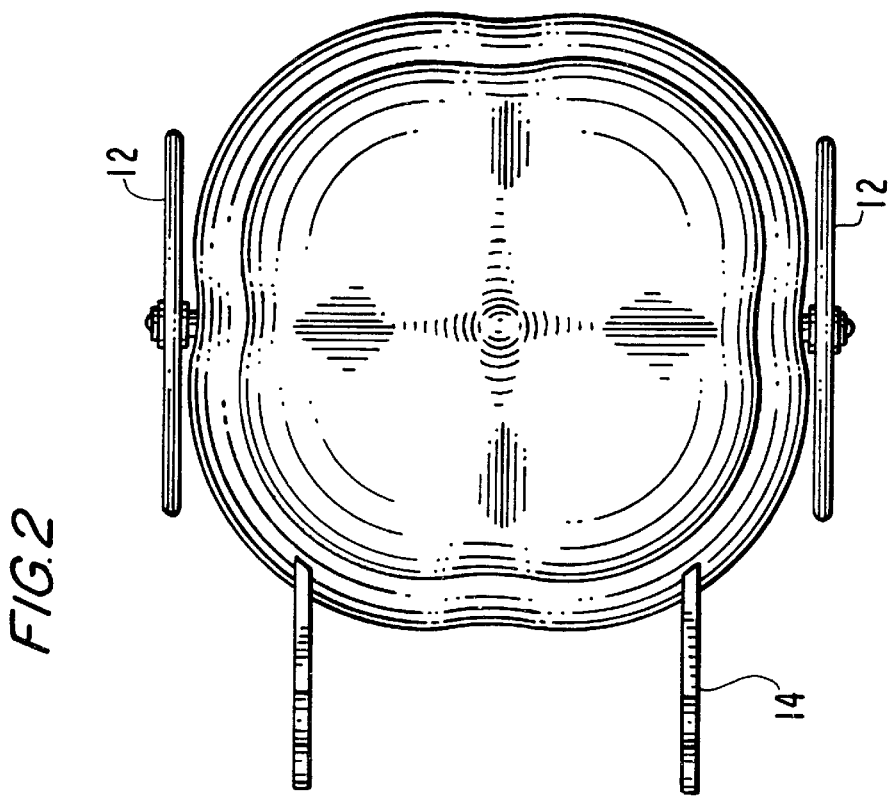
FIG. 2 is a top view thereof.
Figure 6:
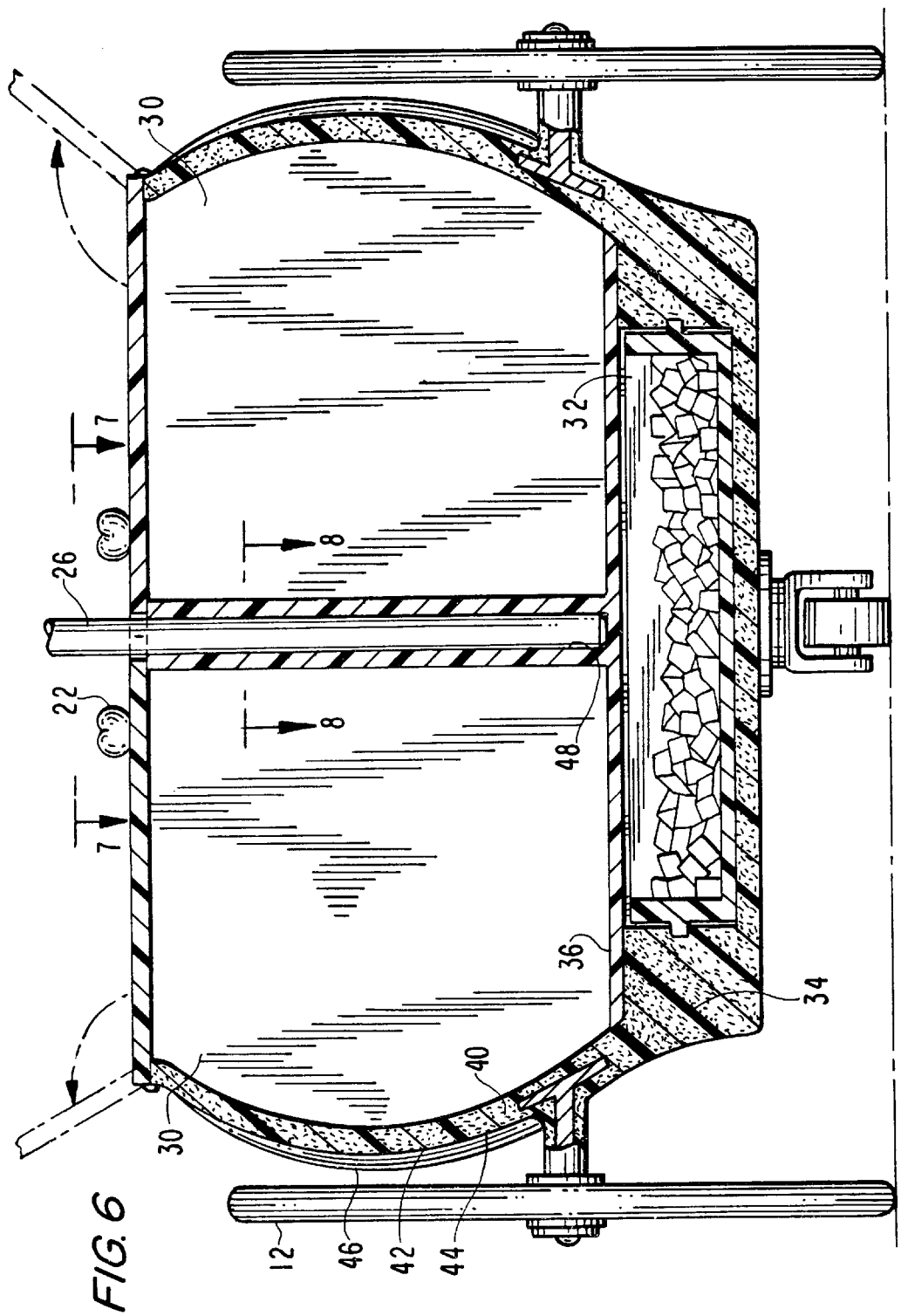
FIG. 6 is a cross-sectional view across 6—6 of FIG. 1.

Turning to the drawing, FIGS. 1–9 show a vendor push cart kiosk having a base 10 with wheels 12, push handles 14, a counter top 16, compartment lids 18 with lid handles 22, and having an umbrella 24 with a pole 26 and a shade portion 28. The pole 26 supports the shade portion 28 and extends upwardly from the base 10. The lids 18 open in response to pulling them open via the lid handles 22. This provides access to the interior compartments 30, which are best seen in FIG. 6. A cold source, such as a block of frozen water ice or dry ice may be arranged in the chamber 32 beneath the interior compartments 30 to keep the compartments 30, and thereby any vendor product within the compartments, cold at temperatures below that of freezing water.

To manufacture, a wooden box 34 is constructed and lined with styrene 36 and may contain plastic dividers. Styrofoam 40 is sculpted to have the desired configuration of the familiar object, such as a majority of an apple. The styrofoam 40 is arranged about the outside of the sidewalls of the wooden box. A fiberglass mesh with concrete 42, available from Calif. Stucco of Hackensack, N.J., is applied about the styrofoam 40 to maintain its integrity. The concrete is allowed to dry for about 24 hours. A plastic bondo 44 is applied over the mesh 42. Prior to hardening of the bondo 44, a tool with sawteeth may be used to shape the bondo 44. After the bondo 44 hardens, it is sanded to provide a smooth surface and to perfect the appearance of the familiar object to be resembled. An outdoor weather resistant paint 46 is then applied over the bondo 44. Preferably, the appearance of the base 10 is shiny, which helps to attract attention to the base 10.

The shade portion 28 of the umbrella 24 is constructed in an analogous manner, but configured to complete the shape of the familiar object. For instance, where the base 10 is configured to resemble a majority of an apple, the shade portion 28 of the umbrella may resemble the remainder of the apple with a stem and leaves visible. The shade portion of the umbrella 24 should likewise appear shiny.

The base 10 is completed by securing the counter top 16, preferably made of acrylic, to the top side of the wooden box 24. The counter top 16 has openings in alignment with the compartments 30 partitioned in the wooden box 24. The lids 18 are hinged to the counter top 16 to swing being an open position, which provide access through the corresponding opening to the respective compartments 30 in alignment with the opening, and a closed position that closes the compartments 30. The lids 18 are lined with styrene 36. The counter top 16 may be painted a color expected of an interior of the familiar object. In the case of an apple, the color may be white or off white.

Figure 7:
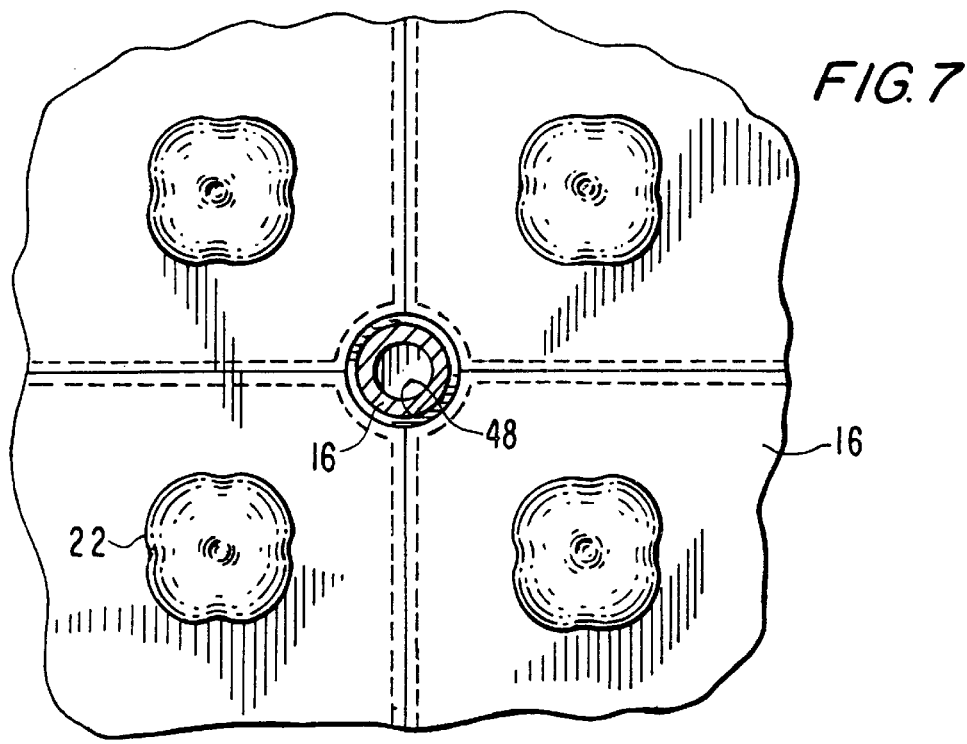
FIG. 7 is a partially broken top view across 7—7 of FIG. 6.

The lid handles are pulled to open the lids 18 and may be configured (in miniature) to resemble the object represented by the shape of the vendor push cart. Thus, the vendor push cart and the handles may be shaped as apples (FIGS. 5, 6 and 7).

Figure 8:
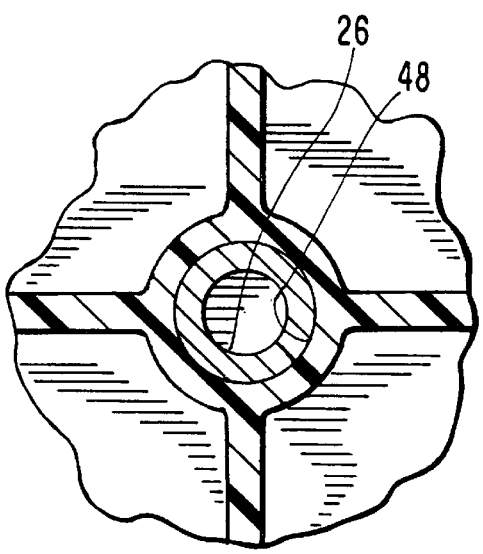
FIG. 8 is a cross-sectional view across 8—8 of FIG. 6.
Figure 9:
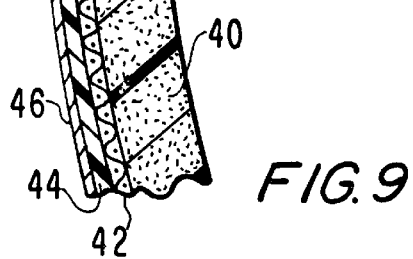
FIG. 9 is a cross-sectional view across 9—9 of FIG. 1.

Finally, the pole 26 elevates the shade portion 28 of the umbrella from the counter top 16 by resting in a holding slot 48 (FIGS. 5, 6 and 8). The pole 26 may be painted a color that complements the color of the base sidewalls, counter top and umbrella top. The various layers that make up the base 10 are best seen in FIGS. 6 and 9. The overall visual effect of the vendor push cart kiosk is eye catching.

Where the vendor push cart is to dispense frozen ices, it is preferable to maintain the temperature at 14 degrees Fahrenheit. This is preferably done by regulation of dry ice refrigeration, which may be housed in styrene and arranged above the floor of the base and beneath the compartments 30. Preferably, temperature sensors are arranged in the compartments to sense the temperature and send signals indicative of the sensed temperature to a controller. The controller determines whether the temperature is rising or dropping too much and, if so, sends command signals to alter the extent of dry ice refrigeration being effected accordingly.

As may be appreciated, the choice of decoration configuration for the vendor push cart kiosk of the present application is an important consideration. Preferably, the decoration is indicative of the geographical area in which the kiosk is to operate and surrounds a periphery of the kiosk. For instance, when used in N.Y. City, the kiosk may take the shape and color of a red apple, reminiscent of the name BIG APPLE that is associated with N.Y. City.

As an alternative, the umbrella 24 may be a conventional, foldable umbrella commonly used on vendor push carts. The decorative nature of the inventive base, therefore, would still be the primary aspect of the vendor push cart that would be eye-catching to attract the passersby. However, it would be preferable to decorate the shade portion of the umbrella so that it complemented the decor of the base.

While the foregoing description and drawings represent the preferred embodiments of the present invention, it will be understood that various changes and modifications may be made without departing from the spirit and scope of the present invention.

I claim:

1. A vendor push cart kiosk, comprising a wheeled base, a shade portion with a pole extending upwardly from the base, the base having an interior with compartments that may accommodate storage of vendor products, the base and the shade portion complementing each other in external configuration, the external configuration of the base portion resembling a majority of an object, the external configuration of the shade portion resembling a remainder of the object so as to complete a shape of the object left out by the base, the base having a counter top with lids under which are the compartments, the base having a substantially rigid cell foam that is sculpted to resemble the portion of the object, a mesh about An exterior of the substantially rigid cell foam, and a formable filler material on the mesh, the mesh including fiberglass and concrete.

2. A vendor push cart kiosk as in claim 1, wherein the base and shade portion each have respective configurations that resemble a fruit.

3. A vendor push cart kiosk as in claim 1, wherein the base and shade portion each have respective configurations that resemble a sports equipment.

4. A vendor push cart kiosk as in claim 1, wherein the base and shade portion each have respective configurations that resemble a container of a vending product that is within the compartments.

5. A vendor push cart kiosk as in claim 1, wherein the base has a box, the substantially rigid cell foam being about the box, the box being lined with styrene, the compartments being within the box.

6. A vendor push cart kiosk as in claim 1, wherein the counter top is made of acrylic.

7. A vendor push cart kiosk as in claim 1, wherein the wheeled base includes four dolly wheels.

8. A vendor push cart kiosk as in claim 7, further comprising a source of cold below water freezing temperature within the base that is arranged to keep the compartments and thereby keep the vendor products cold.

9. A vendor push cart kiosk as in claim 1, wherein the lids are arranged to close the compartments and further comprising handles attached to the lids, the handles having a shape indicative of at least the portion of the object.

10. A method of making a vendor push cart kiosk, comprising configuring a wheeled base to have an exterior whose shape resembles a majority of an object and to have an interior configured into compartments to accommodate storage of vendor products, arranging a pole to extend upwardly from the wheeled base to support a shade portion above the base, configuring the shade portion to have an exterior whose shape that resembles a remainder of the object so as to complete the shape of the object left out by the base and complement the exterior of the shade portion, the base having a counter top with lids under which are the compartments, the base having a substantially rigid cell foam, the configuring of the wheeled base including sculpting to resemble the portion of the object, arranging a mesh about an exterior of the substantially rigid cell foam, and providing a formable filler material on the mesh, the mesh including fiberglass and concrete.

11. A method as in claim 10, further comprising maintaining a temperature within the compartments at below water freezing temperature while environmental outdoor temperature exceed water freezing temperature.

* * * * *